United States Patent Office 3,079,677
Patented Mar. 5, 1963

3,079,677
WELDING WIRE FOR LOW ALLOY STEELS
AND RESULTING WELD
Charles R. Felmley, Jr., Livingston, N.J., assignor to Air Reduction Company, Incorporated, New York, N.Y., a corporation of New York
No Drawing. Filed Nov. 23, 1959, Ser. No. 854,574
5 Claims. (Cl. 29—196.1)

The invention relates to improvements in wire for welding high yield strength and high impact resistant low alloy steels.

There are certain applications for high yield strength, high impact resistant low alloy steels which require that such steels, and their welded zones, withstand a stress-relief-annealing heat treatment, and still be capable of furnishing a high measure of yield strength, and impact resistance at low temperatures. In weldments of considerable thickness, for example, for plates four (4) inches in thickness, many of the welds must be subjected to a series of stress-relief-anneals. Consequently, the weld metal may have to withstand an unusually prolonged heat treatment, as much as forty (40) hours at approximately 1150° to 1200° F., without incurring adverse effects in its mechanical properties.

Accordingly, the primary object of the invention is to provide a wire or electrode suitable for welding high yield strength, high impact resistant steels, wherein the wire furnishes a weld deposit which has high yield strength and impact properties in the as-welded condition and which after the severe degrading effect of the heat treatment of the magnitude as aforesaid, affords high values of yield strength and impact resistance at low temperatures.

This and other objects, and advantages and improved results will be apparent from the following detailed description of a preferred embodiment of the invention.

A welding wire made in accordance with the invention consists essentially of the following composition, the amounts indicated being by weight:

|  | Percent |
|---|---|
| Carbon | .04—.10 |
| Manganese | 1.75–2.10 |
| Phosphorus | .020 max. |
| Sulfur | .025 max. |
| Silicon | .30–.50 |
| Nickel | .45–.70 |
| Molybdenum | .20–.40 |
| Copper | .40–1.40 |

The balance is substantially or essentially iron, with traces of other metals.

An example of a steel having high yield strength, and high impact resistance at temperatures as low as minus 60° F., and which may be stress-relief-annealed for a period as long as 40 hours at approximately 1150° to 1200° F., while still maintaining its high tensile and impact properties, is a low alloy steel known as HY–80. Such steel is more particularly described in Navy Specification Mil–S–16216B. For plate having a thickness in excess of 51.0 pounds per square foot, the composition, by percent weight analysis, is as follows:

|  | Percent |
|---|---|
| Carbon | .23 max. |
| Manganese | .10–.40 |
| Phosphorus | .040 max. |
| Sulphur | .045 max. |
| Silicon | .12–.38 |
| Nickel | 2.68–3.32 |
| Chromium | 1.29–1.91 |
| Molybdenum | .37–.63 |

The balance is essentially iron.

The welding wire of the invention is particularly suitable for welding thick plates, for example, plates of HY–80 steel having a thickness of four inches, and which may require multi-pass welding with a series of stress-relief-anneals equivalent to 40 hours at approximately 1150° F. It will be understood, however, that other high strength, low alloy steels may also be welded with the welding wire of the invention, examples of such steels being a low alloy steel made in accordance with ASTM–302, and the low alloy steel known as T-steel.

It is preferred to use the welding wire of the invention in an inert-gas-shielded electric arc welding process. More particularly, it is preferred to use the welding wire in accordance with the basic method described in Muller et al. No. 2,504,868, April 18, 1950, or as described in Rothschild et al. No. 2,810,818, October 22, 1957. The diameter of the wire electrode, the shielding gas used, the rate of gas flow, the use of reverse polarity direct current, the values of current and arc voltage, rate of welding, and rate of wire feed are preferably and essentially the same as described in the Rothschild et al. patent. The welding wire of the invention may also be used in other arc welding processes such as that disclosed and claimed in United States Patent No. 2,886,696 and in the submerged arc welding process.

In greater detail, plates of HY–80 steel have been welded with a welding wire consisting essentially of the following composition, the amounts indicated being by weight:

|  | Percent |
|---|---|
| Carbon | .092 |
| Manganese | 2.00 |
| Phosphorus | .009 |
| Sulphur | .023 |
| Silicon | .41 |
| Nickel | .53 |
| Molybdenum | .25 |
| Copper | .81 |

The balance is substantially or essentially iron, with traces of other metals, particularly titanium. The copper, while preferably included by alloying in the charge or heat from which the wire is made, may be provided in the amount indicated by copper plating the finished wire, which otherwise may contain only a trace of copper.

It is preferred to fabricate the welding wire from a heat or charge which has been treated with titanium or a titanium-bearing deoxidizing agent. It has been determined that the use of a selected amount of titanium as the deoxidant for the charge from which the wire is made inhibits grain growth to thereby prevent loss of yield strength after prolonged heat treatment of the weld deposit. Preferably titanium in the form of ferro-titanium in an amount of the order of 4.0 pounds per ton, or approximately 1.8 pounds per ton of equivalent titanium, is provided by the addition thereof to the charge as the final deoxidizer. After meltdown, and with the charge up to temperature, the usual primary deoxidizers, silicon and manganese may be added, and the charge skimmed. The ferro-titanium is then added, and after skimming again, the ingot from which the wire is made is then cast.

In the as-welded condition, the weld metal provided by a wire having the composition set forth above, and made from an ingot processed as specifically described above, furnished a yield strength, at 0.2% offset, of 102,750 pounds per square inch. The impact resistance of the weld metal, in terms of V-Notch Charpy, was 54 foot-pounds at minus 60° F., and 34 foot-pounds at minus 100° F.

After the described weldment was subjected to stress-relief-annealing for 40 hours at 1150° F., it exhibited a yield strength of 80,350 p.s.i. The impact resistance of the thus severely heat-treated weldment actually increases, furnishing 60 foot-pounds at minus 60° F., and 39 foot-pounds at minus 100° F.

It is believed that the advantages of the invention will be apparent from the foregoing detailed description. The welding wire provides weldments having high yield strength and high impact resistance, not only in the as-welded condition, but also after stress-relief-annealing for long periods.

While a preferred embodiment of the invention has been described, it will be apparent that various changes may be made without departing from the spirit and scope of the invention as set forth in the following claims.

I claim:

1. A welding wire for welding high yield strength, high impact resistance low alloy steels, said wire consisting essentially of, in approximate amounts by percent weight analysis, .04 to .10 carbon; 1.75 to 2.10 manganese; .020, maximum, phosphorus; .025, maximum sulfur; .30 to .50 silicon; .45 to .70 nickel; .20 to .40 molybdenum; and .40 to 1.40 copper; the balance being substantially iron.

2. A welding wire which is suitable for gas-shielded arc welding of high yield strength, high impact resistance low alloy steels and which provides a weld deposit which after prolonged heat treatment affords high values of yield strength and impact resistance at low temperatures, said wire consisting essentially of, in approximate amounts by percent weight analysis, .04 to .10 carbon; 1.75 to 2.10 manganese; .020, maximum, phosphorus; .025, maximum, sulfur; .30 to .50 silicon; .45 to .70 nickel; .20 to .40 molybdenum; and .40 to 1.40 copper; the balance being substantially iron, and said wire being formed from a charge which after meltdown of its ingredients has a final deoxidizing treatment with titanium in the amount of 1.8 pounds per ton of said charge.

3. A welding wire which is suitable for gas-shielded arc welding of high yield strength, high impact resistance low alloy steels and which provides a weld deposit which after prolonged heat treatment affords high values of yield strength and impact resistance at low temperatures, said wire consisting essentially of, in approximate amounts by percent weight analysis, .092 carbon; 2.00 manganese; .009 phosphorus; .023 sulfur; .41 silicon; .53 nickel; .25 molybdenum; and .81 copper; the balance being substantially iron.

4. A welding wire which is suitable for gas-shielded arc welding of high yield strength, high impact resistance low alloy steels and which provides a weld deposit which after prolonged heat treatment affords high values of yield strength and impact resistance at low temperatures, said wire consisting essentially of, in approximate amounts by percent weight analysis, .092 carbon; 2.00 manganese; .009 phosphorus; .023 sulfur; .41 silicon; .53 nickel; .25 molybdenum; and .81 copper; the balance being substantially iron, and said wire being formed from a charge which after meltdown of its ingredients has a final deoxidizing treatment with titanium in the amount of 1.8 pounds per ton of said charge.

5. A welded product in which low alloy steel parts having the percentage composition

| | |
|---|---|
| Carbon | .23 max. |
| Manganese | .10–.40 |
| Phosphorus | .040 max. |
| Sulphur | .045 max. |
| Silicon | .12–.38 |
| Nickel | 2.68–3.32 |
| Chromium | 1.29–1.91 |
| Molybdenum | .37–.63 |
| Iron | Balance | are joined by electric arc welding with weld metal deposited from a wire electrode having the percentage composition

| | |
|---|---|
| Carbon | .04–.10 |
| Manganese | 1.75–2.10 |
| Phosphorus | .020 max. |
| Sulfur | .025 max. |
| Silicon | .30–.50 |
| Nickel | .45–.70 |
| Molybdenum | .20–.40 |
| Copper | .40–1.40 |
| Iron | Balance |

References Cited in the file of this patent

UNITED STATES PATENTS

| | | |
|---|---|---|
| 925,659 | Schneider | June 22, 1909 |
| 2,343,643 | Cape | Mar. 7, 1944 |
| 2,537,207 | Carlson | Jan. 9, 1951 |
| 2,622,978 | Andette | Dec. 23, 1952 |
| 2,817,751 | Phillips | Dec. 24, 1957 |
| 2,913,815 | Muller | Nov. 24, 1959 |
| 2,937,083 | Sherwin | May 17, 1960 |